United States Patent [19]

Stowe, Jr. et al.

[11] Patent Number: 4,996,032
[45] Date of Patent: Feb. 26, 1991

[54] PROCESS FOR REMOVING SULFUR DIOXIDE FROM FLUE GASES

[75] Inventors: Donald H. Stowe, Jr., Beaver; Lewis B. Benson, Coraopolis, both of Pa.

[73] Assignee: Dravo Lime Company, Pittsburgh, Pa.

[21] Appl. No.: 454,271

[22] Filed: Dec. 21, 1989

[51] Int. Cl.$^5$ .............. C01B 17/00; C01F 1/00; C01F 5/14; C01F 11/02
[52] U.S. Cl. .................................. 423/242; 423/164
[58] Field of Search .......... 423/242 A, 242 R, 244 A, 423/244 R, 164

[56] References Cited

U.S. PATENT DOCUMENTS

| | | | |
|---|---|---|---|
| 3,617,212 | 11/1971 | Shah | 423/242 |
| 3,919,394 | 11/1975 | Selmeczi | 423/242 |
| 3,985,860 | 10/1976 | Mandelik et al. | 423/242 |
| 4,046,856 | 9/1977 | Itoo et al. | 423/166 |
| 4,193,971 | 3/1980 | Kawamata et al. | 423/242 |
| 4,246,245 | 1/1981 | Abrams et al. | 423/242 |
| 4,490,341 | 12/1984 | Cares | 423/242 |

OTHER PUBLICATIONS

"Dolomitic Lime Process for Retrofit FGD Applications" Jack Z. Abrams, et al., *Proceedings–Second Annual Pittsburgh Coal Conference* (1985), pp. 199–211.

Primary Examiner—Gregory A. Heller
Attorney, Agent, or Firm—Parmelee, Miller, Welsh & Kratz

[57] ABSTRACT

A process for removing sulfur dioxide from a flue gas in a wet scrubber with an aqueous slurry formed from calcium hydroxide and magnesium hydroxide with magnesium hydroxide or magnesium oxide recovered therefrom. A thickened sludge from a thickener containing calcium sulfite solids is separated and an aqueous sulfite solution removed, with a first portion of the solution returned to the thickener while a second portion thereof is oxidized to form a sulfate solution. Lime is added to the sulfate solution to precipitate calcium sulfate and form an aqueous magnesium hydroxide suspension, with the precipitated calcium sulfate separated from the magnesium hydroxide suspension which may be dewatered to form a magnesium hydroxide product or calcined to produce magnesium oxide.

11 Claims, 2 Drawing Sheets

PROCESS FOR REMOVING SULFUR DIOXIDE FROM FLUE GASES

CROSS-REFERENCE TO RELATED APPLICATION

This application is related to co-pending application Ser. No. 188,254 filed April 29, 1988 in the name of Donald H. Stowe, Jr. and entitled "Process for Desulfurization of Sulfur Dioxide-Containing Gas Streams, and also to co-pending application Ser. No. 395,667, filed Aug. 18, 1989 in the name of Ronald J. Rathi and Lewis B. Benson and entitled, "Flue Gas Desulfurization with Oxidation of Calcium Sulfite in FGD Discharges", both of which applications are assigned to the assignee of the present application.

BACKGROUND OF THE INVENTION

In the process described in application Ser. No. 188,254, a sulfur dioxide-containing gaseous stream is contacted with a solution containing magnesium hydroxide in a scrubbing unit with a portion of the spent scrubbing medium oxidized and the oxidized product treated with a magnesium-containing lime slurry to obtain regenerated magnesium hydroxide for recycle to the scrubbing unit. In that process, scrubber liquor sulfites are oxidized to sulfates with the addition of a magnesium-containing lime to the oxidized scrubber liquor to precipitate magnesium hydroxide and calcium sulfate, and the calcium sulfate or gypsum is separated from the magnesium hydroxide. The magnesium hydroxide is then recycled to the scrubbing unit since it is the alkali required by the scrubbing system.

In the method described in application Ser. No. 395,667, calcium sulfite present in an aqueous sludge from a flue gas desulfurization (FGD) system is separated as a sludge containing at least 20 weight percent solids from the scrubbing slurry, contacted with acid to dissolve the calcium sulfite, and oxidation of the calcium sulfite effected to form a calcium sulfate precipitate. The calcium sulfate precipitate is then separated from the aqueous media as high quality gypsum.

In flue gas desulfurization systems where an aqueous slurry is used that is formed from calcium hydroxide and a predetermined amount of magnesium hydroxide, and where a magnesium containing lime is used to form the slurry, magnesium oxide dissolves and the magnesium, in the form of $Mg^{++}$ ion, accumulates in the water contained in the system. Such magnesium is eventually discarded along with the calcium sulfite sludge that is produced in the scrubbing process. Since magnesium oxide is quite valuable as compared to lime, any recovery of the magnesium from the flue gas desulfurization sludge would be beneficial. Recovery of such magnesium will also reduce runoff of soluble magnesium salts from landfills that contain calcium sulfite produced in a scrubbing process. Recovery of magnesium will also make the use of magnesium-containing lime more attractive in FGD systems because a valuable by-product can easily be recovered.

SUMMARY OF THE INVENTION

The present process for removing sulfur dioxide from flue gases in a wet scrubber uses an aqueous slurry formed from calcium hydroxide and magnesium hydroxide and provides for the recovery of magnesium hydroxide or magnesium oxide therefrom.

After contact of the aqueous slurry with the flue gases, the slurry contains calcium sulfite solids and dissolved magnesium sulfite. The slurry is then discharged from the scrubber and passed to a thickener. In the thickener, a thickened sludge which contains calcium sulfite solids is separated from overflow liquor that contains dissolved magnesium sulfite. Overflow liquor is returned to the wet scrubber for recycle. The thickened sludge is concentrated, preferably by filtering, with calcium sulfite removed as a filter cake, and water containing dissolved magnesium sulfite in solution separated therefrom. A first portion of the sulfite solution or filtrate is returned to the thickener, while a second portion of said sulfite solution is subjected to oxidation to convert magnesium sulfite to sulfate. Lime is then added to the sulfate solution so as to precipitate calcium sulfate and form magnesium hydroxide. The precipitated calcium sulfate is then separated from the magnesium hydroxide suspension, and the latter is preferably dewatered to form a magnesium hydroxide product. If desired, the magnesium hydroxide may be calcined so as to provide a product comprising magnesium oxide.

In a preferred embodiment of the present process, the water resulting from the dewatering of the magnesium hydroxide suspension is used to slake lime that is added to the sulfate solution following the oxidation step. Also, it is preferred that a portion of the precipitated calcium sulfate separated from the magnesium hydroxide suspension is returned to the sulfate solution following oxidation to provide seed crystals for precipitation of further calcium sulfate.

DESCRIPTION OF THE DRAWING

The present invention will become more readily apparent from the following description of preferred embodiments thereof shown, by way of example only, in the accompanying drawings, wherein.

DETAILED DESCRIPTION

The present process provides for the removal of sulfur dioxide from flue gases using a magnesium ion-containing lime slurry with the process providing for the recovery of magnesium hydroxide or magnesium oxide as a by-product of the process.

As is conventional, a scrubbing slurry formed from calcium hydroxide and magnesium hydroxide, and which contains magnesium hydroxide present in an amount to provide an effective magnesium ion content in a scrubbing tower of between about 2500 and 9000 parts per million, is passed through a scrubbing system for removing sulfur dioxide from flue gases. As is known in the art, the effective amount of magnesium ion in such scrubbing solutions is that amount over and above the chloride ion content of the aqueous medium present in the scrubbing unit. Since chloride ions tend to interfere with the effect of magnesium ions present in the scrubbing solution, only those magnesium ions over and above that required to form magnesium chloride in the scrubbing unit are considered to be "effective" in the removal of sulfur dioxide from the flue gas.

After contact of the slurry with the flue gases, the slurry contains calcium sulfite solids and dissolved magnesium sulfite. This spent slurry is discharged from the wet scrubber and passed to thickener where a thickened sludge that contains calcium sulfite solids is separated from a liquor that contains dissolved magnesium sulfite. It is from the wet scrubber discharge that the process of the present invention effectively recovers magnesium hydroxide and/or magnesium oxide as a product.

Figure 1:
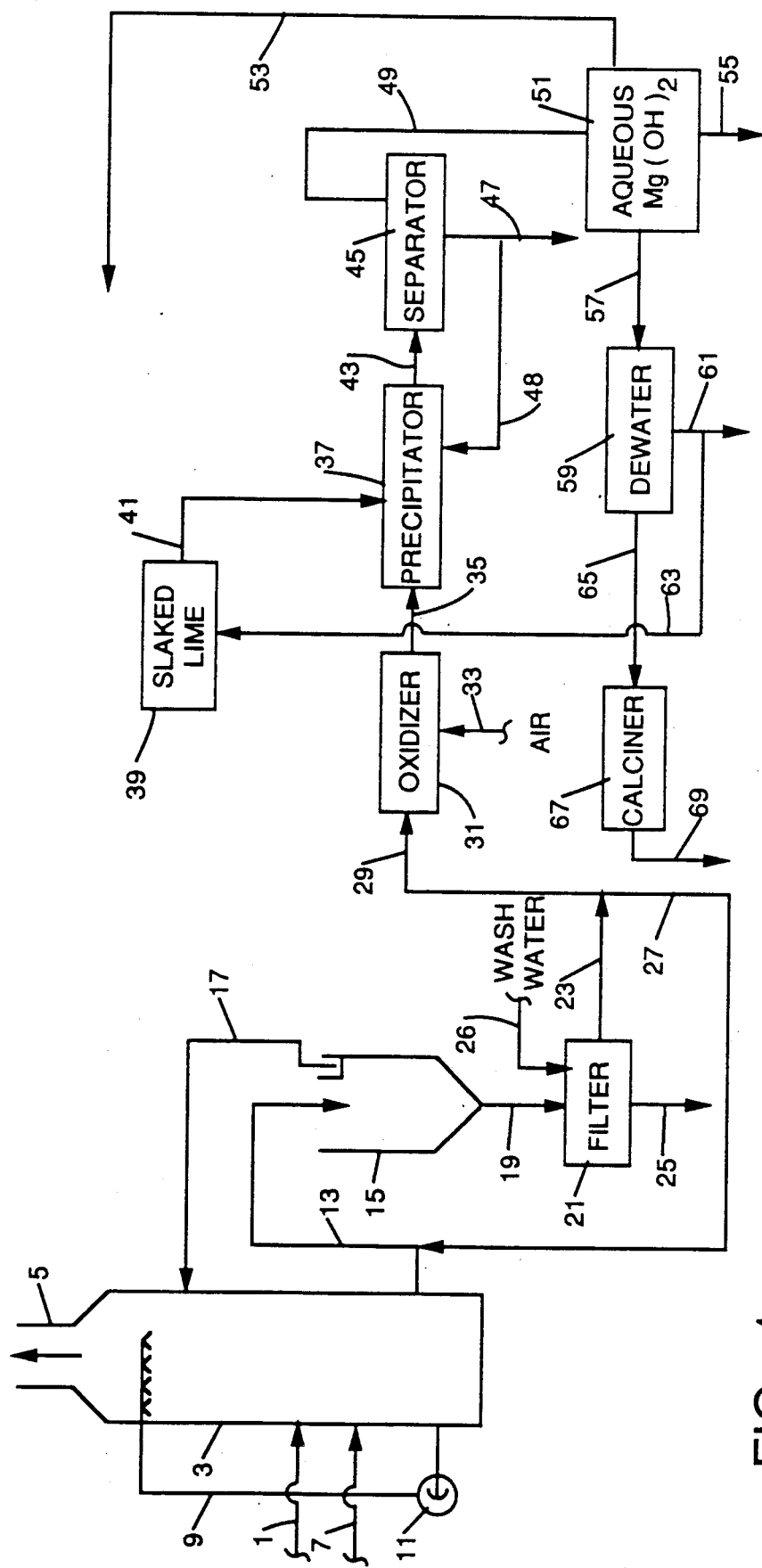
FIG. 1 is a flow diagram illustrating the presently preferred process of the present invention.

Referring now to FIG. 1, the present preferred process is schematically illustrated. Flue gases through line 1 are charged to a wet scrubber 3 and discharged therefrom through outlet 5 after removal of sulfur dioxide gases. An aqueous slurry formed from calcium hydroxide and magnesium hydroxide, and which contains an effective magnesium ion content of between 2500 and 9000 ppm in the wet scrubber 3, is charged to the wet scrubber 3 through line 7 and scrubs the gases. Scrubbing slurry is recycled from the lower portion of the scrubber 3 through line 9, containing pump 11, for use in scrubbing, as is conventional. Aqueous slurry, after contact with the flue gases in the scrubber 3 is also discharged from the wet scrubber 3 through line 13. In conventional scrubbing systems, the slurry discharged from the wet scrubber 3 through line 13 would have a solids content of about 6-10 percent by weight. In the present process, however, the scrubber discharge through line 13 should have a solids content of between about 1-4 percent by weight, and preferably 2-3 percent by weight to enable better filtration as hereinafter described. The discharge from line 13 passes to a thickener 15 in which a thickened aqueous sludge containing calcium sulfite solids is separated from a clarified liquor or overflow liquor, with the overflow liquor, containing dissolved magnesium sulfite, returned to the wet scrubber as recycle through line 17. The thickened aqueous sludge will normally be at a pH of about 7-8 and will contain between about 25-35 percent by weight solids. The thickened sludge separated from the overflow liquor in the thickener 15 is discharged therefrom through line 19 to a concentrator, such as a filter 21, where a sulfite solution of water containing dissolved magnesium sulfite is removed through line 23, while a concentrated sludge, mainly calcium sulfite solids is removed through line 25 for discharge. The concentrated sludge or filter cake will normally have a solids content of about 40-50 percent by weight. In the separation taking place in filter 21, wash water can be added through line 26 to wash the calcium sulfite solids separated therein, with the wash water combined with the solution removed through line 23. A first portion of the aqueous sulfite solution from line 23 is returned to the thickener 15 through lines 27 and 13, while a second portion of the aqueous sulfite solution is fed through line 29 to an oxidizer 31. The pH of the contents of the oxidizer should be maintained between a pH of about 2-8. While the oxidation itself will effect the pH, some acidification might be used. The contact time in the oxidizer should be that sufficient to convert the magnesium sulfite to magnesium sulfate. In the oxidizer 31, air is charged through line 23 to oxidize magnesium sulfite to magnesium sulfate and forms an aqueous sulfate solution which is passed though line 35 to a precipitator 37. Slaked lime from a source 39 is fed through line 41 to the precipitator 37 which contains the sulfate solution following the oxidation, the lime precipitating calcium sulfate from the sulfate solution while at the same time forming an aqueous magnesium hydroxide suspension. The slaked lime should have a concentration of about 10-25 weight percent lime in water with preferably the value being at the higher end of that range. The amount of lime added should be a stoichiometric amount relative to the magnesium present in the sulfate solution and sufficient to produce a pH in the sulfate solution of a value greater than 9.0, a value at which the magnesium hydroxide is insoluble in water. The aqueous media which now contains precipitated calcium sulfate solids and suspended magnesium hydroxide is then passed though line 43 to a separator 45. In the separator 45, such as a hydroclone, the calcium sulfate solids are separated from the magnesium hydroxide suspension and are discharged through line 47, while the magnesium hydroxide suspension is discharged through line 49 to provide a collected magnesium hydroxide-containing aqueous media 51. A portion of the precipitated calcium sulfate separated from the magnesium hydroxide suspension and discharged through line 47 may be returned through line 48 to the sulfate solution following oxidation to provide seed crystals for precipitation of further calcium sulfate in precipitator 37. The magnesium hydroxide-containing aqueous media will comprise a suspension of about 1-2 weight percent magnesium hydroxide in water, with the water containing only minimal amounts of calcium chloride and/or calcium sulfate in dissolution.

If desired, a portion of the aqueous media containing magnesium hydroxide 51 may be returned through line 53 to the wet scrubber 3 and used as a source of magnesium ions in the scrubbing slurry. Or, the remainder or all of the magnesium hydroxide-containing aqueous media may be discharged through line 55 for use or sale elsewhere.

In another embodiment of the process, where it is desired to produce more concentrated magnesium hydroxide aqueous media, or a magnesium oxide product, the aqueous media containing magnesium hydroxide may be passed through line 57 to a dewatering unit 59 where water is removed and discharged through line 61. A portion of the removed water from line 61, since it contains n solids and only trace amounts of calcium chloride and/or calcium sulfate, is preferably fed through line 63 and used to slake lime and form the slaked lime 39. The magnesium hydroxide is passed from the dewatering unit 59 through line 65 to a calciner 67 wherein the magnesium hydroxide is converted to magnesium oxide which is discharged through line 69 for use or sale.

Figure 2:
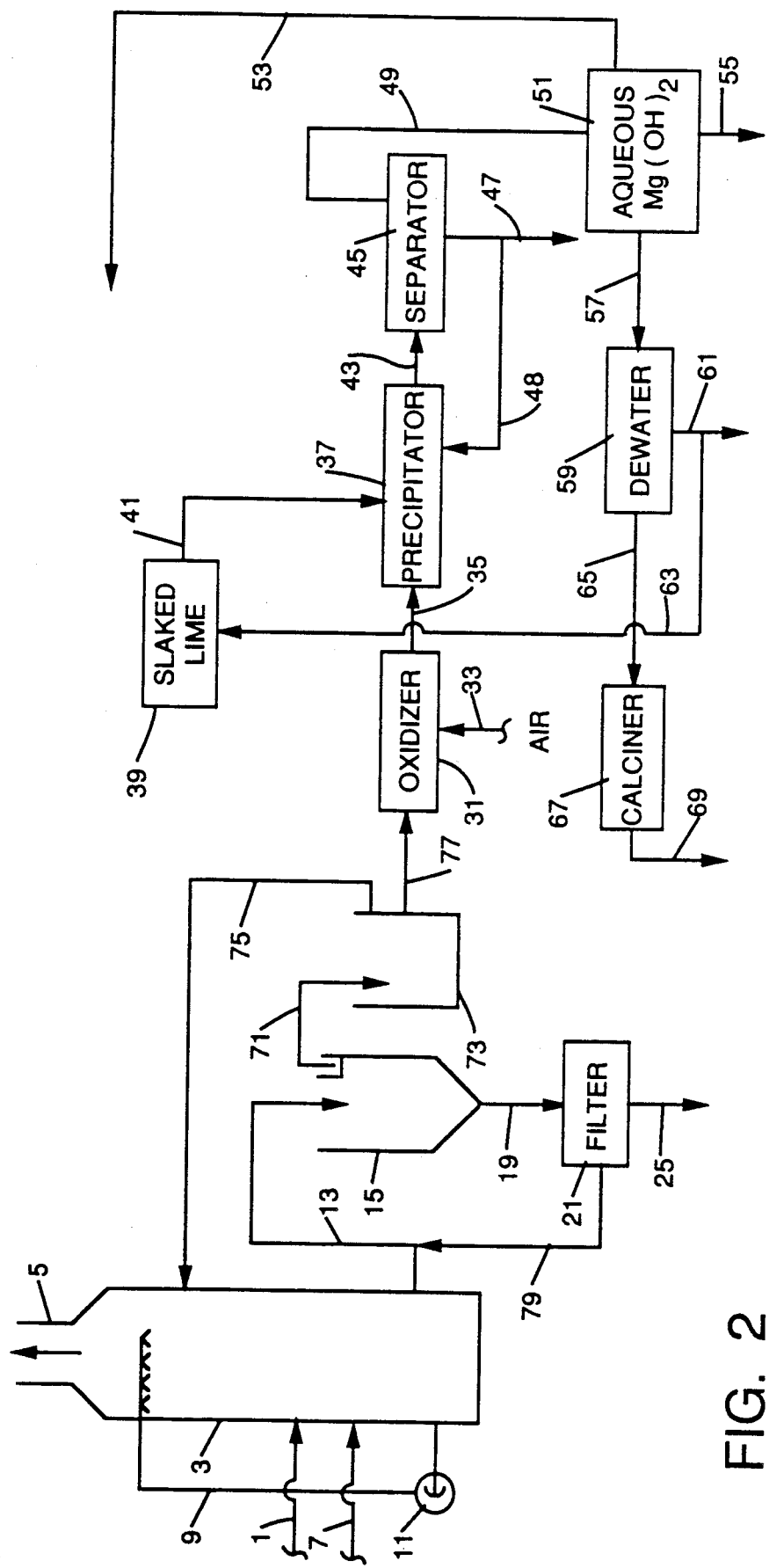
FIG. 2 is a flow diagram illustrating an alterative embodiment of the process of the present invention.

In the embodiment illustrated in FIG. 2, which uses like numerals for like components illustrated in FIG. 1, the overflow liquor from the thickener 15 is passed through line 71 to an overflow hold tank 73. The overflow tank contains sulfite liquor, a portion of which is returned to the wet scrubber 3 through line 75, while the remainder of the sulfite liquor is passed to the oxidizer 31 through line 77 and processed as previously described. The separated thickened sludge is discharged from the thickener 15 and concentrated, such as by filter 21, with water containing dissolved magnesium sulfite returned to the thickener 15 through lines 79 and 13, while the concentrated sludge, namely calcium sulfite solids is removed through line 25 for discharge.

What is claimed is:

1. In a process for removing sulfur dioxide from flue gases in a wet scrubber, wherein an aqueous slurry formed from calcium hydroxide and magnesium hydroxide is contacted in said wet scrubber with said flue gases, and said slurry, after said contact, contains calcium sulfite solids and dissolved magnesium sulfite, and is discharged from said wet scrubber and passed to a thickener wherein a thickened aqueous sludge containing calcium sulfite solids is separated from an overflow liquor, the improvement comprising:

returning at least a portion of the overflow liquor to the wet scrubber;

concentrating said thickened aqueous sludge by removal of a sulfite solution, comprising water containing dissolved magnesium sulfite, therefrom;

returning a first portion of said sulfite solution to said thickener;

oxidizing magnesium sulfite in a second portion of said sulfite solution to form a sulfate solution containing magnesium sulfate;

adding lime to said sulfate solution following said oxidation, to precipitate calcium sulfate and form an aqueous magnesium hydroxide suspension; and separating precipitated calcium sulfate from said aqueous magnesium hydroxide suspension.

2. In the process as defined in claim 1, the improvement wherein said magnesium hydroxide is present in the aqueous slurry in an amount to provide an effective magnesium ion content of between 2500 and 9000 parts per million in the wet scrubber.

3. In the process as defined in claim 1, the improvement comprising dewatering said aqueous magnesium hydroxide suspension to form a magnesium hydroxide product.

4. In the process as defined in claim 3, the improvement wherein said lime added to said sulfate solution following said oxidation is slaked lime, and water resulting from dewatering of said aqueous magnesium hydroxide suspension is used in formation of said slaked lime.

5. In the process as defined in claim 3, the improvement comprising calcining said dewatered magnesium hydroxide product to produce magnesium oxide.

6. In the process as defined in claim 1, the improvement wherein a portion of the precipitated calcium sulfate separated from said aqueous magnesium hydroxide suspension is returned to said sulfate solution following oxidation to provide seed crystals for precipitation of further said calcium sulfate.

7. In the process as defined in claim 1, the improvement wherein all of said overflow liquor is returned to the wet scrubber, and said thickened aqueous sludge is filtered to provide calcium sulfite solids and a filtrate comprising a sulfite solution of magnesium sulfite in water.

8. In the process as defined in claim 7, the improvement comprising washing the filtered calcium sulfite solids with water and combining said wash water with said filtrate.

9. In a process for removing sulfur dioxide from flue gases in a wet scrubber, wherein an aqueous slurry formed from calcium hydroxide and magnesium hydroxide, and which contains magnesium hydroxide in the amount to provide an effective magnesium ion content of between 2500 and 9000 parts per million in the wet scrubber, is contacted in said wet scrubber with said flue gases, and said slurry, after said contact, contains calcium sulfite solids and dissolved magnesium sulfite, and is discharged from said wet scrubber and passed to a thickener wherein a thickened aqueous sludge containing calcium sulfite solids is separated from an overflow liquor, the improvement comprising:

returning the overflow liquor to the wet scrubber;

concentrating said thickened aqueous sludge by removal of a sulfite solution comprising water containing dissolved magnesium sulfite therefrom;

returning a first portion of said removed sulfite solution to said thickener;

oxidizing magnesium sulfite in a second portion of said removed sulfite solution to form a sulfate solution containing magnesium sulfate;

adding slaked lime to said sulfate solution, following said oxidation, to precipitate calcium sulfate from and form an aqueous magnesium hydroxide suspension;

separating said precipitated calcium sulfate from said aqueous magnesium hydroxide suspension and returning a portion of the separated calcium sulfate to said sulfate solution following oxidation to provide seed crystals for precipitation of further calcium sulfate; and dewatering said aqueous magnesium hydroxide suspension to form a magnesium hydroxide product.

10. In the process as defined in claim 9, the improvement comprising concentrating said thickened aqueous slurry by filtering to form a filter cake of calcium sulfite solids, and a filtrate comprising water containing dissolved magnesium sulfite in solution, and washing said filter cake with water, which wash water is combined with said filtrate.

11. In the process as defined in claim 9, the improvement comprising adding water from the dewatering of said magnesium hydroxide suspension to lime to form said slaked lime.

* * * * *